United States Patent [19]

Davis

[11] Patent Number: 4,458,420

[45] Date of Patent: Jul. 10, 1984

[54] SHEAR PIN HILT FOR KNIFE

[76] Inventor: Kurtis D. Davis, 8530 E. 66th Pl. S. - No. B, Tulsa, Okla. 74133

[21] Appl. No.: 515,200

[22] Filed: Jul. 20, 1983

[51] Int. Cl.³ .............................................. B23P 11/00

[52] U.S. Cl. .................................... 30/342; 16/114 R; 16/DIG. 24; 81/471; 145/61 J

[58] Field of Search ................. 30/340, 342, 344, 324; 81/471; 403/2; 16/110 R, 111 R, 114 R, DIG. 18, DIG. 24, DIG. 40; D7/131; D8/80, 83, 107, DIG. 7; 145/61 J

[56] References Cited

U.S. PATENT DOCUMENTS

| | | | |
|---|---|---|---|
| 881,075 | 3/1908 | Hosking | 81/471 |
| 1,099,079 | 6/1914 | Alden | 81/471 |
| 2,267,325 | 12/1941 | Dickerman | 30/342 X |
| 2,327,924 | 8/1943 | Mounts . | |
| 3,241,237 | 3/1966 | Eastman | 30/344 |
| 3,513,720 | 5/1970 | Allport | 74/553 |
| 3,599,528 | 8/1971 | Kushnick | 85/62 |
| 4,177,352 | 12/1979 | Dunbar et al. | 174/1 |

*Primary Examiner*—E. R. Kazenske
*Assistant Examiner*—Douglas D. Watts
*Attorney, Agent, or Firm*—Head, Johnson & Stevenson

[57] ABSTRACT

An impact-resistant knife hilt comprising a hollow handle containing a clevis with shear pin connecting the knife blade to a bolt passing through the end cap of the knife handle. Such a knife is readily assembled and disassembled by tightening or removing the bolt while the hilt with shear pin reduces the risk of blade breakage upon their impact.

4 Claims, 3 Drawing Figures

SHEAR PIN HILT FOR KNIFE

BACKGROUND OF THE INVENTION

1. Field of the Invention

This invention relates to an impact resistant handle. More specifically, this invention relates to a knife hilt or the like equipped with a shear pin mechanism.

2. Description of the Prior Art

The basic concept of providing a knife with a hilt or handle that can be disassembled and reassembled is generally known. Usually the purpose for such a structure is to facilitate manufacturing of the knife with the additional benefit of enhancing the ability to clean the structure. One problem that frequently accompanies such a knife and knives in general is the fact that upon severe impact, the knife blade will tend to either break or bend, particularly at the point where the blade decreases in size as it enters the hilt. Various other types of hand tools also exhibit this tendency. The customary approach to reducing the incidence of breakage is to strengthen the device by increasing the physical size of the blade or tool within the handle. However, this has the disadvantage of altering the balance and dimensions of the tool. Thus, ideally, it would be useful to have a shock or impact resistant handle without significant increase in the mass or relative distribution of mass of the tool.

SUMMARY OF THE INVENTION

In view of the prior art problems, I have discovered an improved impact-resistant handle comprising:

(a) a substantially hollow tubular handle member;

(b) a first end piece covering one end of the hollow tubular handle member wherein the first end piece has an opening therein for accepting one end of a tool;

(c) a tool wherein one end of the tool extends through the opening in the first end piece terminating within the handle member;

(d) a second end piece covering the other end of the hollow tubular handle wherein the second end piece has an opening therein for accepting a threaded tension applying means;

(e) a threaded tension applying means; and (f) a shear pin means within the handle member wherein the shear means is attached to the terminal end of the tool and is threadably engaged to the tension applying means.

Further according to the present invention, the shear pin means comprises a clevis attached to the terminal end of the tool within the handle by use of a shear pin passing through this clevis and tool and wherein the clevis also threadably engages to a tension applying bolt or the like operatively engaged to the end cap of the handle. Preferably, the tool according to the present invention is a knife blade having a hole or opening at the end opposite to the point of the knife for accepting the shear pin.

It is an object of the present invention to provide a knife hilt or tool handle that can be easily assembled and disassembled and also provide improved impact resistance, thus reducing the incidence of breakage. It is a further object of the present invention to provide the impact resistance by use of a shear pin which breaks before the tool or handle would break. Fulfillment of these objects and the presence and fulfillment of other objects will be apparent upon complete reading of the specification and claims when taken in conjunction with the attached drawings.

DESCRIPTION OF THE PREFERRED EMBODIMENTS

Figure 1:
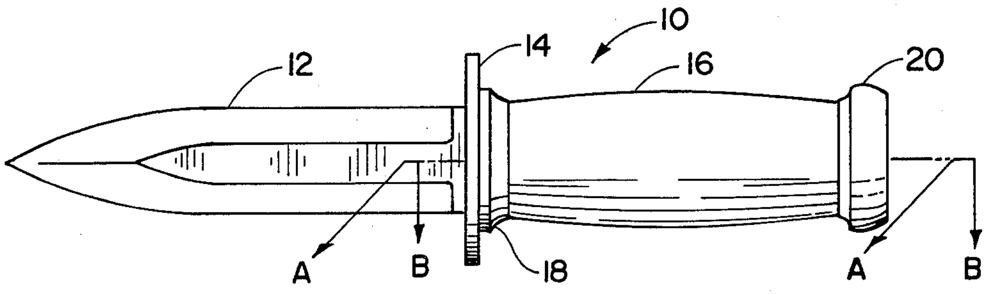
FIG. 1 illustrates a cross-sectional side view of a knife according to the present invention.

The improved shear pin knife hilt and impact resistant tool handle of the present invention, how they operate and differ from previously known devices and the advantages associated with their use can perhaps be best explained and understood by reference to the drawings. FIG. 1 is a side view of a double edged hunting knife or dagger, generally designated by the numeral 10, containing the shear pin hilt according to the present invention. From this external view, the knife 10 appears to be a conventional device in that it is made up of a blade 12, front finger guard 14, handle 16 and front and rear handle caps 18 and 20. However, the partial cut away views of FIGS. 2 and 3 disclose the novel shear pin mechanism of the present invention within the hollow tubular handle member 16. In describing this feature and the invention as a whole, it should be kept in mind that although the drawings illustrate and the following discussion is limited to a knife hilt, the invention relates broadly to any hand tool wherein breakage upon impact is a problem. As such, the following discussion should be viewed as encompassing more than merely knife hilts.

Figure 2:
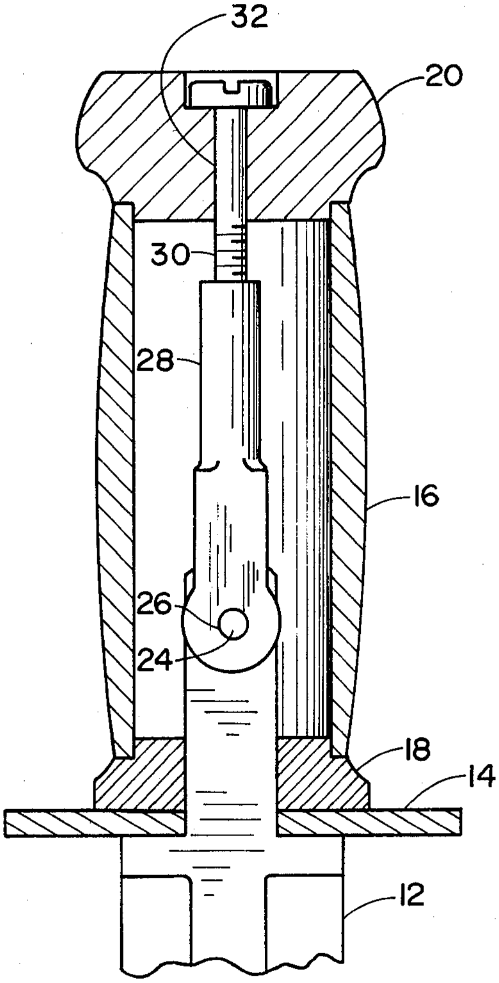
FIG. 2 is a partial cross-sectional view of the knife hilt of FIG. 1 as seen through line A—A.
Figure 3:
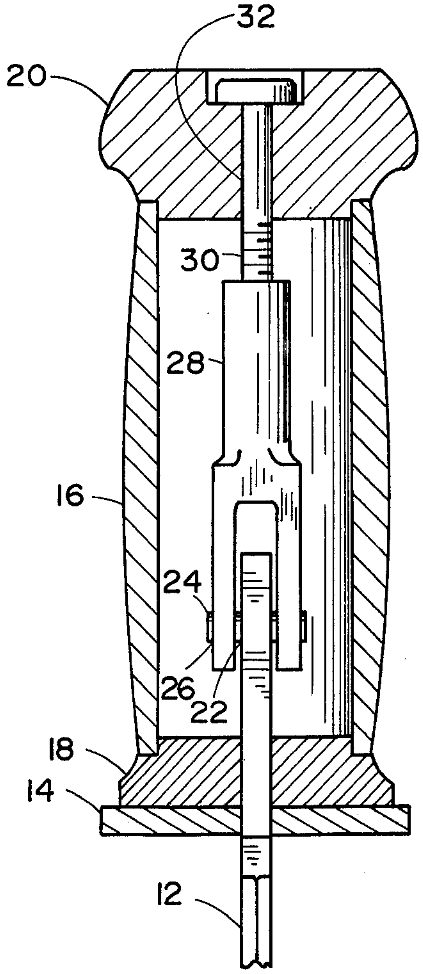
FIG. 3 is a partial cross-sectional view of the knife hilt of FIG. 1 as seen through line B—B.

As illustrated in FIGS. 2 annd 3, the handle member 16 is a hollow tubular element having end caps 18 and 20 enclosing the novel shear pin mechanism. In the specific embodiment illustrated herein, the blade 12 passes through the finger guard 14 and front end cap 18 terminating within the hollow handle member 16. The terminal end of the blade 12 contains an opening 22 through which shear pin 24 passes. Shear pin 24 also passes through openings 26 in clevis element 28. The other end of clevis 28 is threadedly engaged to bolt 30 that passes through opening 32 in end cap 20.

By threading bolt 30 into the clevis 28, tension is applied between the blade 12 and the end cap 18 of the shear pin mechanism. This tension in turn creates a compressive force on the finger guard 14, end caps 18 and 20 and hollow tubular handle 16, thus holding the knife and hilt in an assembled state. To disassemble the knife, bolt 30 is merely removed from the clevis 28 and the remaining pieces essentially fall apart. To reassemble, the pieces are stacked on the blade and the bolt is inserted through the end cap and threaded into the clevis with sufficient force to hold the handle together.

In operation, the knife hilt (or tool handle) will function in a normal manner with one additional feature attributable to the presence of the shear pin mechanism. If the blade of the knife is struck against a hard surface or object with sufficient force to otherwise break the blade, which customarily will occur at the narrow region passing through the handle, instead of breaking the blade, the shear pin will break. Thus, the risk of irreversible damage to the knife on severe impact is signficantly reduced. If the shear pin breaks, it can be easily replaced by dissasembling and reassembling the hilt (with a new shear pin) as previously described.

The knife or tool handle can be manufactured out of any of the conventional materials provided the handle or hilt is hollow such as to accommodate the shear pin mechanism. The position of the shear pin can be selected according to the anticipated maximum force and torque that the unit will withstand. The relative orientation of the clevis and shear pin can also be selected according to the anticipated impact such that the shear force will selectively break the shear pin rather than the blade. Thus, as illustrated, the shear pin in this specific embodiment is perpendicular to the flat surface of the blade. For a different application, the shear pin and clevis can be easily modified such that the pin is perpendicular to the anticipated force created by the impact.

The handle or hilt surrounding and enclosing the shear pin mechanism can be made by any of the methods well known in the art. The device can involve any of a combination of elements also well known in the art. Thus, the illustrated knife hilt can involve the finger guard and/or front end piece as well as the handle of a single element. Similarly the fork element of the clevis can be directed towards the rear of the hilt or handle with use of additional threaded members or fasteners.

Having thus described the preferred embodiments with a certain degree of particularity, it is manifest that many changes can be made in the details of construction, arrangement and fabrication of the elements and their uses without departing from the spirit and scope of this invention. Therefore, it is to be understood that the invention is not limited to the embodiment set forth herein for purposes of exemplification, but is to be limited only by the scope of the attached claims, including a full range of equivalents to which each element thereof is entitled.

I claim:

1. An impact-resistant handle with tool comprising:

(a) a substantially hollow tubular handle member;

(b) a first end piece covering one end of said hollow tubular handle member wherein said first end piece has an opening therein for accepting one end of a tool;

(c) a tool wherein one end of said tool extends through said opening in said first end piece terminating within said handle member;

(d) a second end piece covering the other end of said hollow tubular handle wherein said second end piece has an opening therein for accepting a threaded tension applying means;

(e) a threaded tension applying means; and (f) a shear pin means within said handle member wherein said shear pin means is attached to said terminal end of said tool and is threadably engaged to said tension applying means.

2. An impact-resistant handle of claim 1 wherein said shear pin means further comprises a clevis attached to said terminal end of said tool by use of a shear pin and said clevis threadably engages to said tension applying means.

3. An impact-resistant handle of claim 2 wherein said tool is a knife blade.

4. A knife handle hilt comprising:

(a) a hollow handle member adapted to accept and hold a knife blade wherein one end of said knife blade terminates within said handle and said terminal end contains an opening adapted to receive a shear pin;

(b) a clevis and shear pin adapted to engage to said terminal end of said knife blade and wherein said clevis is further adapted to receive a threaded member;

(c) an end cap adapted to fit and cover the other end of said hollow handle member; and (d) a threaded member operatively attached to said end cap and threadably engaged to said clevis such that tightening said threaded member will hold said knife blade and handle hilt in an assembled state.

* * * * *